US011941232B2

(12) United States Patent
Kumar et al.

(10) Patent No.: US 11,941,232 B2
(45) Date of Patent: Mar. 26, 2024

(54) CONTEXT-BASED COPY-PASTE SYSTEMS

(71) Applicant: Adobe Inc., San Jose, CA (US)

(72) Inventors: Harish Kumar, Noida (IN); Praveen Kumar Dhanuka, Howrah (IN); Arushi Jain, Ashok Vihar (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/832,923

(22) Filed: Jun. 6, 2022

(65) Prior Publication Data

US 2023/0393711 A1    Dec. 7, 2023

(51) Int. Cl.
*G06F 3/048* (2013.01)
*G06F 3/0481* (2022.01)
*G06F 3/0484* (2022.01)
*G06T 3/00* (2006.01)

(52) U.S. Cl.
CPC .......... *G06F 3/0484* (2013.01); *G06F 3/0481* (2013.01); *G06T 3/0056* (2013.01)

(58) Field of Classification Search
None
See application file for complete search history.

(56) References Cited

U.S. PATENT DOCUMENTS

| | | | |
|---|---|---|---|
| 10,402,954 B2 | 9/2019 | Biswas | |
| 10,748,316 B2 | 8/2020 | Phogat et al. | |
| 10,783,396 B2 | 9/2020 | Biswas et al. | |
| 11,295,499 B1 | 4/2022 | Beri et al. | |
| 2007/0229526 A1* | 10/2007 | Hsu | G06F 9/451 |
| | | | 345/581 |
| 2008/0309676 A1* | 12/2008 | Nehab | G06T 9/00 |
| | | | 345/611 |
| 2011/0229022 A1* | 9/2011 | Yamada | G06T 3/00 |
| | | | 382/162 |
| 2014/0043363 A1* | 2/2014 | Bala | G06T 11/60 |
| | | | 345/629 |
| 2014/0313209 A1 | 10/2014 | Hu et al. | |
| 2017/0060819 A1* | 3/2017 | Rucine | G06F 3/0485 |
| 2017/0098122 A1* | 4/2017 | el Kaliouby | G06V 40/171 |
| 2018/0024726 A1* | 1/2018 | Hviding | G06V 40/174 |
| | | | 715/204 |

(Continued)

OTHER PUBLICATIONS

"Advanced OpenGL Instancing", Learn Open GL [retrieved Apr. 20, 2022]. Retrieved from the Internet <https://learnopengl.com/Advanced-OpenGL/Instancing>., 16 Pages.

(Continued)

*Primary Examiner* — Hua Lu
(74) *Attorney, Agent, or Firm* — FIG. 1 Patents

(57) ABSTRACT

In implementations of context-based copy-paste systems, a computing device implements a context system to receive input data describing a selection of a vector object. The context system detects vicinity vector objects based on a bounding box of the vector object and bounding boxes of the vicinity vector objects. A transformation is identified based on similarities between the vicinity vector objects and target vector objects. The context system generates a modified vector object for display in a user interface by transforming the vector object using the transformation and reproducing the transformed vector object relative to a particular target vector object of the target vector objects.

20 Claims, 13 Drawing Sheets

(56) References Cited

U.S. PATENT DOCUMENTS

| | | | | |
|---|---|---|---|---|
| 2018/0026925 A1* | 1/2018 | Kennedy | ................ | H04W 4/02 |
| | | | | 715/753 |
| 2018/0047200 A1* | 2/2018 | O'Hara | ................ | G06V 10/242 |
| 2019/0019333 A1* | 1/2019 | Kumar | ................ | G06T 15/405 |
| 2019/0130548 A1* | 5/2019 | Biswas | ................ | G06T 5/40 |
| 2019/0354793 A1* | 11/2019 | Biswas | ................ | G06T 7/593 |
| 2020/0073485 A1* | 3/2020 | Al-Halah | ............ | G06F 16/5846 |
| 2020/0118313 A1* | 4/2020 | Phogat | ................ | G06F 3/04845 |
| 2020/0202481 A1* | 6/2020 | Brigg | ................ | G06T 1/20 |
| 2020/0219295 A1* | 7/2020 | el Kaliouby | ............ | G06T 11/00 |
| 2020/0326829 A1* | 10/2020 | Hu | ................ | G06F 3/04812 |
| 2021/0042381 A1 | 2/2021 | Kumawat et al. | | |
| 2021/0209826 A1* | 7/2021 | Bonansea | ................ | H04L 51/10 |
| 2021/0248805 A1* | 8/2021 | Jesus | ................ | G06T 9/00 |
| 2021/0350122 A1* | 11/2021 | Dixon | ................ | G06F 3/04883 |
| 2021/0382610 A1* | 12/2021 | Prasad | ................ | G06F 3/04886 |
| 2022/0075845 A1* | 3/2022 | Bowen | ................ | G06F 30/30 |
| 2022/0164589 A1* | 5/2022 | Upshinskii | ........... | G06V 30/153 |
| 2022/0270261 A1* | 8/2022 | Dudovitch | ............. | G06T 7/194 |
| 2022/0300081 A1* | 9/2022 | Eirinberg | ............ | G06V 20/46 |
| 2022/0319075 A1* | 10/2022 | Hu | ................ | H04L 51/10 |
| 2022/0319078 A1* | 10/2022 | Kozakov | ................ | H04L 51/52 |
| 2023/0377265 A1 | 11/2023 | Kumar et al. | | |

OTHER PUBLICATIONS

"Tessellation (computer graphics)", Wikipedia, the free encyclopedia [retrieved Apr. 20, 2022]. Retrieved from the Internet <https://en.wikipedia.org/wiki/Tessellation_(computer_graphics)>., 3 Pages.

Asente, Paul , et al., "Dynamic Planar Map Illustration", ACM Transactions on Graphics, vol. 26, No. 3 [retrieved Aug. 26, 2022]. Retrieved from the Internet <https://doi.org/10.1145/1276377.1276415>., Jul. 29, 2007, 10 pages.

Krzeminsk, Marek , "OpenGL Batch Rendering", Gamedev.net [retrieved Apr. 20, 2022]. Retrieved from the Internet <https://www.gamedev.net/tutorials/programming/graphics/opengl-batch-rendering-r3900/>., Nov. 22, 2014, 14 Pages.

U.S. Appl. No. 17/746,052 , "Non-Final Office Action", U.S. Appl. No. 17/746,052, dated Jun. 8, 2023, 17 pages.

U.S. Appl. No. 17/746,052 , "Final Office Action", U.S. Appl. No. 17/746,052, dated Oct. 16, 2023, 20 pages.

* cited by examiner

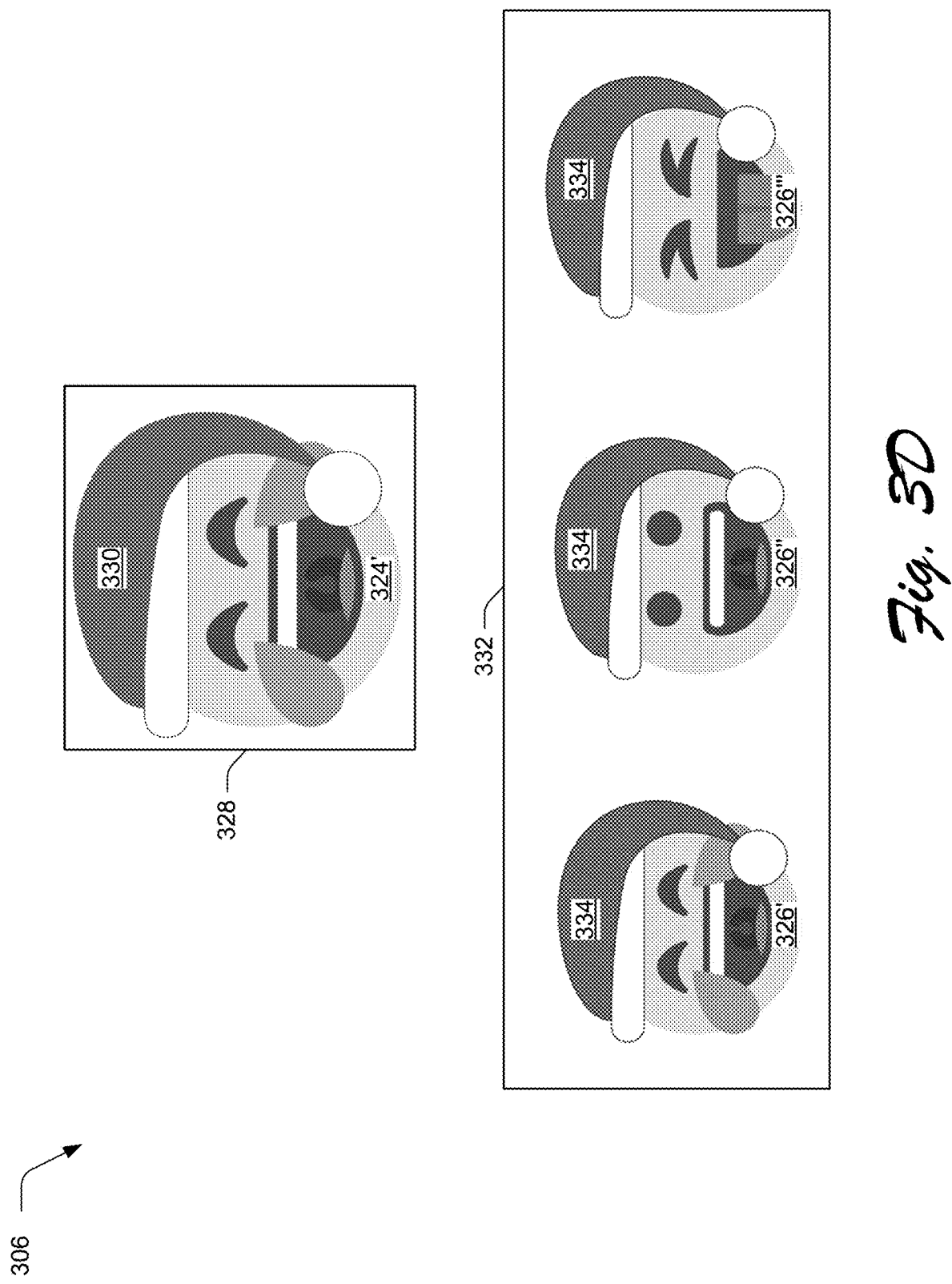

400

402
Receive input data describing a selection of a vector object

404
Detect vicinity vector objects based on a bounding box of the vector object and bounding boxes of the vicinity vector objects

406
Identify a transformation based on similarities between the vicinity vector objects and target vector objects

408
Generate a modified vector object for display in a user interface by transforming the vector object using the transformation and reproducing the transformed vector object relative to a particular target vector object of the target vector objects

*Fig. 4*

CONTEXT-BASED COPY-PASTE SYSTEMS

BACKGROUND

When a vector object is copied within an application for creating and/or editing digital content and then pasted in a user interface of the application, the pasted vector object is located at a static or default location in the user interface. The default location (e.g., a center of the user interface) is not related to other vector objects in a location from which the vector object is copied or to other vector objects displayed in the user interface. Because of this, a user interacts with an input device (e.g., a mouse, a touchscreen, a stylus, etc.) relative to the user interface to relocate the pasted vector object from the default location to a desired location in the user interface. This relocation also frequently involves modifying the pasted vector object to improve a visual appearance of the pasted vector object in the desired location. Manually relocating and modifying each pasted vector object in this manner is tedious and prone to user error which is a limitation of conventional copy-paste systems.

SUMMARY

Context-based copy-paste systems are described. In one example, a computing device implements a context system to receive input data describing a selection of a vector object. The context system detects vicinity vector objects based on a bounding box of the vector object and bounding boxes of the vicinity vector objects. For instance, the bounding boxes of the vicinity vector objects are adjacent to or overlapping the bounding box of the vector object.

For example, the context system identifies a transformation based on similarities between the vicinity vector objects and target vector objects. In this example, the transformation is usable to transform a vicinity vector object to be identical to at least one of the target vector objects. The context system generates a modified vector object for display in a user interface by transforming the vector object using the transformation and reproducing the transformed vector object relative to a particular target vector object of the target vector objects.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, and 3D illustrate examples of transforming a selected vector object for reproduction relative to a single target vector object and for reproduction relative to multiple target vector objects.

FIG. 4 is a flow diagram depicting a procedure in an example implementation in which input data describing a selection of a vector object is received and a modified vector object is generated for display in a user interface by transforming the vector object.

DETAILED DESCRIPTION

Overview

Figure 1:
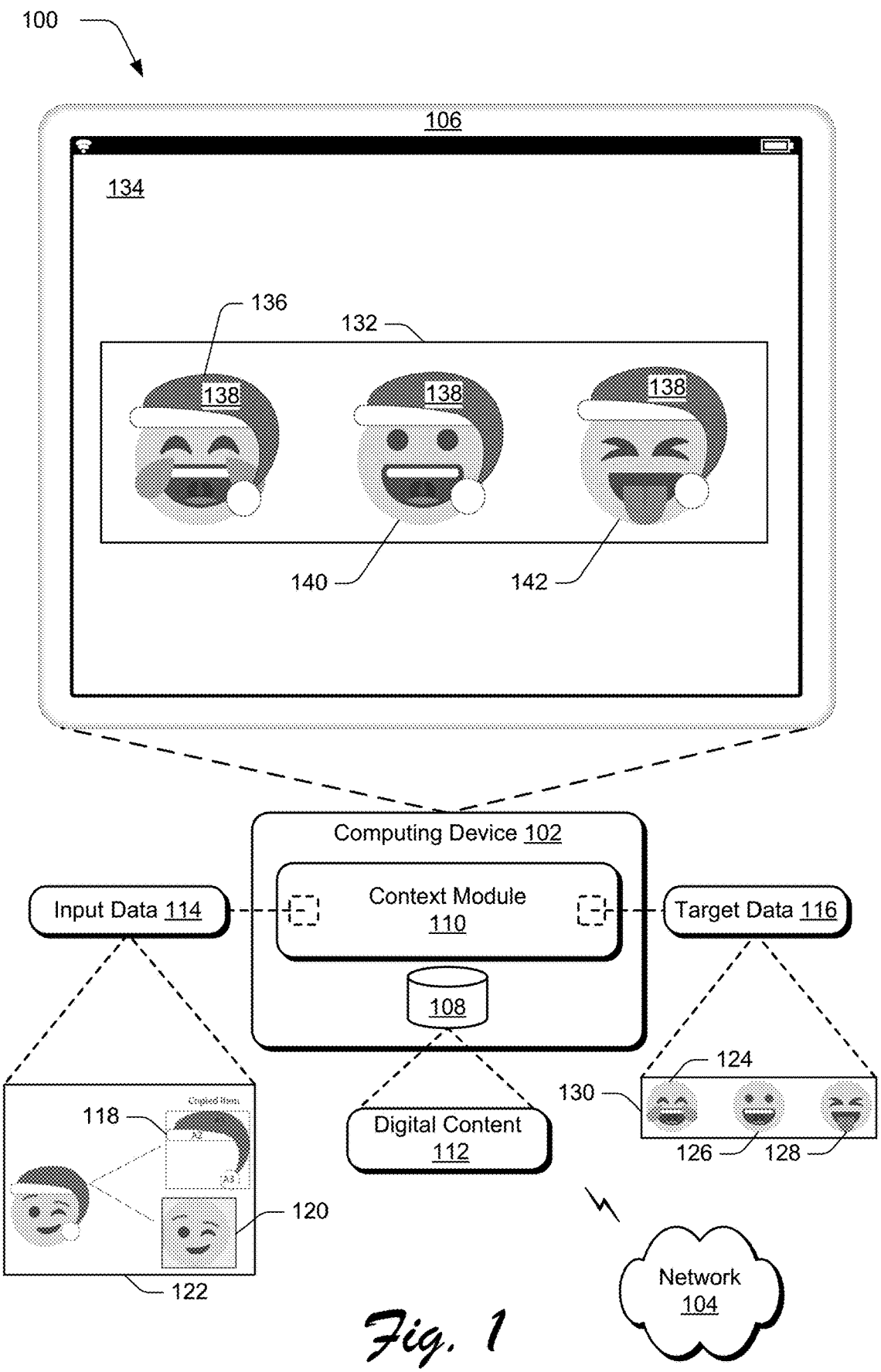
FIG. 1 is an illustration of an environment in an example implementation that is operable to employ digital implementations of context-based copy-paste systems and techniques as described herein.

In conventional copy-paste systems, a vector object copied in an application for creating and/or editing digital content is pasted in a default location in a user interface of the application. The default location is unrelated to digital content displayed in the user interface, and the default location is not a desirable location for the pasted vector object. Because of this, a user interacts with an input device (e.g., a touchscreen, a mouse, a stylus, etc.) relative to the user interface of the application to relocate the pasted vector object from the default location to the desired location. This relocation also typically involves transforming the pasted vector object to improve a visual appearance of the pasted vector object in the desired location. Manually relocating and transforming each pasted vector object in this manner is tedious and prone to user error which is a limitation of conventional copy-paste systems.

In order to overcome the limitations of conventional systems, context-based copy-paste systems are described. In an example, a computing device implements a context system to receive input data describing a selection of a vector object. The vector object is included in a source or copied environment that includes other vector objects.

The vector object is to be reproduced in a target or pasted environment that includes target vector objects and the context system leverages information from the source or copied environment to determine how to reproduce the target vector object in the target or pasted environment. For instance, the context system detects vicinity vector objects from the other vector objects in the source or copied environment based on a bounding box of the vector object and bounding boxes of the vicinity vector objects. In one example, the context system detects the vicinity vector objects as having bounding boxes that are adjacent to or overlap the bounding box of the vector object.

For example, the context system identifies a particular transformation for the vector object based on transformations which transform the vicinity vector objects to be identical to the target vector objects included in the target or pasted environment. To do so in one example, the context system determines affine transformations that transform the vicinity vector objects to be identical to the target vector objects. The context system determines a score for each transformation based on a number of the target vector objects that are identical to vicinity vector objects transformed by the transformation and a visual saliency of the transformation. For instance, the visual saliency is computed based on a cumulative area of the vicinity vector objects transformed by the transformation. The context system then identifies the particular transformation for the vector object as having a highest score.

The context system transforms the vector object using the particular transformation and reproduces the transformed vector object relative to the target vector objects in the target or pasted environment. For example, the context system is capable of reproducing the transformed vector object relative to a single target vector object or multiple target vector objects of the target vector objects. The context system is also capable of determining candidate vector objects for receiving the transformation in the target or pasted environment based on similarities between the vicinity vector objects and the target vector objects. The context system generates indications of the candidate vector objects for display in a user interface in some examples.

The described systems are capable of transforming a selected vector object and reproducing the transformed vector object relative to target vector objects automatically and without user intervention. This is not possible in conventional copy-paste systems that are limited to pasting vector objects in default locations and require the user to interact with the input device to transform and relocate the pasted vector objects to desirable locations. The described systems are also capable of reproducing the transformed vector object relative to a single target vector object or multiple target vector objects which is also not possible in conventional copy-paste systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a context module 110. The storage device 108 is illustrated to include digital content 112 such as digital images, graphic artwork, digital videos, etc.

The context module 110 is illustrated as having, receiving, and/or transmitting input data 114 and also as having, receiving, and/or transmitting target data 116. The input data 114 describes a selected vector object 118 and also vicinity vector objects 120 that are adjacent to the vector object 118 or overlapping the vector object 118 in a copied or source environment 122 of a copy-paste pipeline. For example, the vector object 118 includes three separate vector objects which define the vector object 118 as a stocking cap or hat. The vicinity vector objects 120 are six vector objects which collectively define an emoji. As shown, the emoji is a winking smiley face that is wearing the stocking cap depicted by the vector object 118 in the copied environment 122.

For instance, the context module 110 receives the input data 114 describing the vector object 118 in the copied or source environment 122 of the copy-paste pipeline, and the context module 110 processes the input data 114 to detect the vicinity vector objects 120. To do so in one example, the context module 110 leverages a bounding box of the vector object 118 and bounding boxes of vector objects included in the copied environment 122 to identify the six vector objects included in the vicinity vector objects 120 as having bounding boxes which are adjacent to or overlap the bounding box of the vector object 118. In one example, the context module 110 uses dilation techniques to identify bounding boxes that are adjacent to the bounding box of the vector object 118.

As part of detecting the vicinity vector objects 120, the context module 110 forms a graph having a source node that represents the vector object 118 in some examples. The context module 110 adds a node to the graph for each vector object in the copied environment 122 having a bounding box that overlaps the bounding box of the vector object 118. For instance, the context module 110 also adds a node to the graph for each vector object in the copied or source environment 122 having a bounding box that is adjacent to the bounding box of the vector object 118.

The nodes of the graph are connected with edges having weights to penalize increasing distances of the adjacent bounding boxes from the vector object 118. For example, nodes of the graph connected by edges having weights above a threshold weight are discarded. After discarding these nodes, the context module 110 determines that one node for each of the vicinity vector objects 120 remains in the graph. Using the graph, the context module 110 identifies the vicinity vector objects 120 as including an open eye, a winking eye, a left eyebrow, a right eyebrow, a mouth, and a face of the emoji. Once identified, the vicinity vector objects 120 are usable to determine a context of the selected vector object 118 in the copied environment 122 which the context module 110 leverages to transform the vector object 118 based on the target data 116.

The target data 116 describes target vector objects 124-128 in a pasted or target environment 130 of the copy-paste pipeline. For example, target vector object 124 is an emoji that is laughing with tears, target vector object 126 is an emoji that is smiling with an open mouth, and target vector object 128 is an emoji with an extended tongue. Each of the target vector objects 124-128 includes multiple vector objects. For instance, the target vector object 124 includes vector objects depicting eyes, tears, a mouth, teeth, a tongue, and a face; the target vector object 126 includes vector objects depicting eyes, a mouth, teeth, a tongue, and a face; and the target vector object 128 includes vector objects depicting eyes, a mouth, a tongue, and a face.

The context module 110 processes the input data 114 and the target data 116 to determine how to reproduce the vector object 118 relative to the target vector objects 124-128 in the pasted or target environment 130. In the copied environment 122, the vector object 118 is scaled to align with the emoji defined by the vicinity vector objects 120. However, in the pasted environment 130, the target vector objects 124-128 are defined at a much smaller relative scale than the vicinity vector objects 120.

Thus, directly reproducing the vector object 118 relative to the target vector objects 124-128 would result in the stocking hat being too large to fit on the emoji that is laughing with tears, the emoji that is smiling with an open mouth, and the emoji with an extended tongue in the pasted environment 130. Accordingly, the context module 110 identifies a transformation based on similarities between the vicinity vector objects 120 and the vector objects of the target vector objects 124-128. Once identified, the context module 110 transforms the vector object 118 using the transformation and reproduces the transformed vector object 118 relative to each of the target vector objects 124-128.

To do so in one example, the context module 110 determines affine transformations for transforming the vicinity vector objects 120 such that one or more of the vector objects of the target vector objects 124-128 are identical to the transformed vicinity vector objects 120. Each determined affine transformation has an associated affine transformation matrix which applies a combination of translation, scaling, and/or rotation to the transformed vicinity vector objects 120 such that the vector objects of the target vector objects 124-128 are identical to the transformed vicinity vector objects 120. The context module 110 then computes a score for each affine transformation matrix based on a number of the vector objects of the target vector objects 124-128 that are identical to vicinity vector objects 120 transformed using the affine transformation matrix and a visual saliency of the transformation. For example, the context module 110 determines the visual saliency based on areas of vicinity vector objects 120 transformed using the affine transformation matrix to be identical to the target vector objects 124-128. The context module 110 uses a transformation matrix having a highest score to transform the vector object 118, and then the context module 110 reproduces the transformed vector object 118 relative to each of the target vector objects 124-128.

Consider an example in which the context module 110 determines that the open eye of the vicinity vector objects 120 is similar to the left eye and the right eye of the target vector object 126. For example, a first transformation matrix which reduces a size of the open eye by a first scale factor causes the transformed open eye of the vicinity vector objects 120 to be identical to the left eye and the right eye of the target vector object 126. The context module 110 determines that the open eye of the vicinity vector objects 120 is transformable using the first scale factor to be identical to two of the vector objects of the target vector objects 124-128.

Continuing this example, the context module 110 determines that the face of the vicinity vector objects 120 is similar to the faces of the target vector objects 124-128. The context module 110 also determines that a second transformation matrix which reduces a size of the face by a second scale factor causes the transformed face of the vicinity vector objects 120 to be identical to the face of the target vector object 124, the face of the target vector object 126, and the face of the target vector object 128. In this example, the context module 110 does not determine additional similarities between the vicinity vector objects 120 and the vector objects of the target vector objects 124-128.

In order to determine whether to use the first scale factor or the second scale factor to transform the vector object 118, the context module 110 computes a score for the first transformation matrix and a score for the second transformation matrix. For example, the second transformation matrix has a higher score than the first transformation matrix because the second scale factor causes three of the vector objects of the target vector objects 124-128 to be identical to the transformed face of the vicinity vector objects 120 and the first scale factor causes two of the vector objects of the target vector objects 124-128 to be identical to the transformed open eye of the vicinity vector objects 120. A visual saliency corresponding to the second scale factor is also greater than a visual saliency corresponding to the first scale factor because a cumulative area of the transformed face of the vicinity vector objects 120 is greater than a cumulative area of the transformed open eye of the vicinity vector objects 120.

The context module 110 transforms the vector object 118 using the second transformation matrix and reproduces the transformed vector object 118 relative to each of the target vector objects 124-128 to generate a set of modified vector objects 132 which is displayed in a user interface 134 of the display device 106. The set of modified vector objects 132 includes a first modified vector object 136 which is the target vector object 124 wearing a transformed vector object 138; a second modified vector object 140 which is the target vector object 126 wearing the transformed vector object 138; and a third modified vector object 142 which is the target vector object 128 wearing the transformed vector object 138. For example, the transformed vector object 138 is scaled to align with the emojis defined by the target vector objects 124-128 such that the stocking hat is appropriately sized for the target vector objects 124-128. The context module 110 is also capable of simultaneously reproducing the transformed vector object 138 relative to the target vector objects 124-128 which is not possible using conventional systems in which the transformed vector object 138 must be separately reproduced for each of the target vector objects 124-128 in the pasted or target environment 130.

Figure 2:
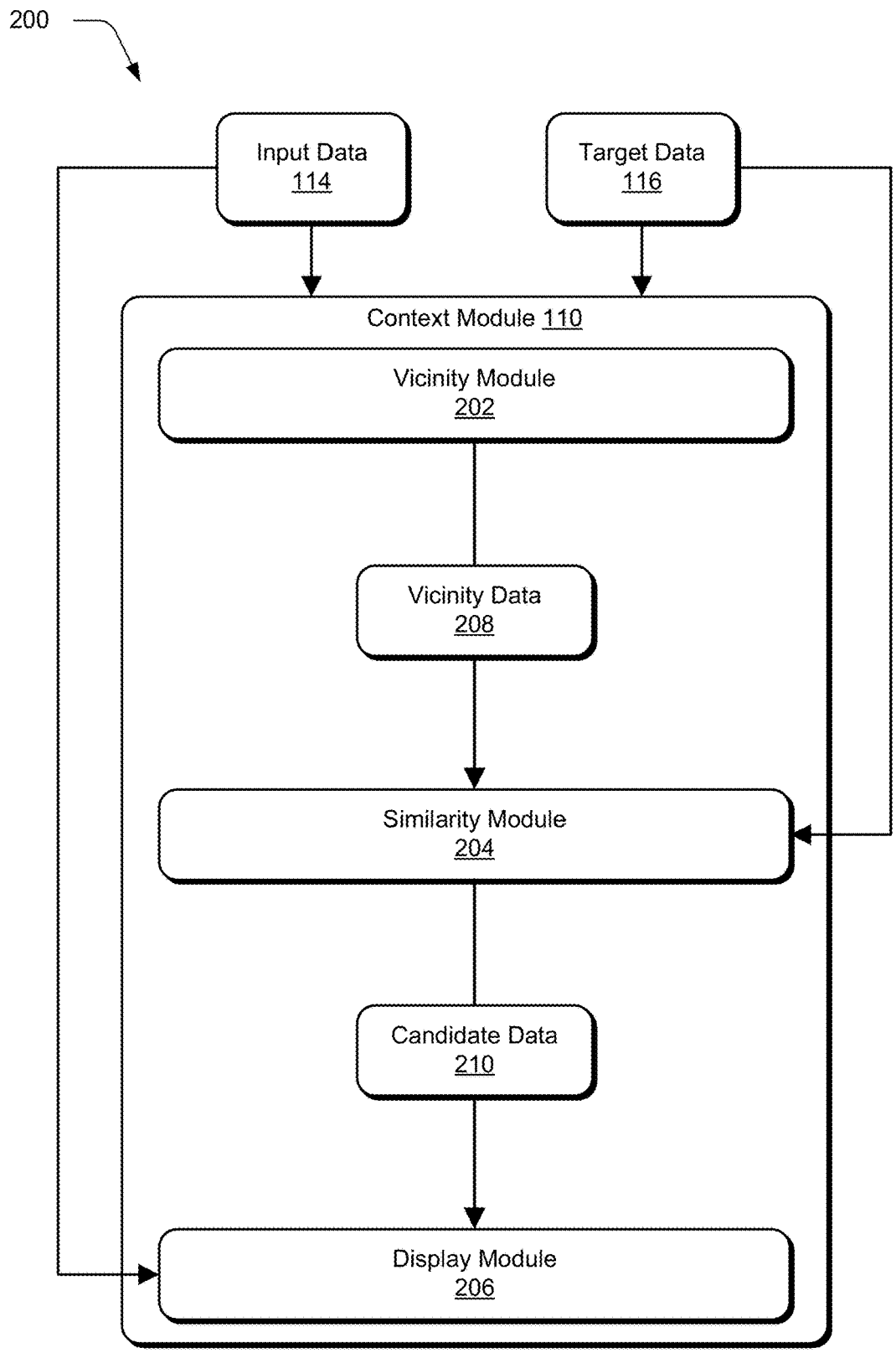
FIG. 2 depicts a system in an example implementation showing operation of a context module for implementing context-based copy-paste systems.

FIG. 2 depicts a system 200 in an example implementation showing operation of a context module 110. The context module 110 is illustrated to include a vicinity module 202, a similarity module 204, and a display module 206. For example, the context module 110 receives the input data 114 and the target data 116 as inputs. As shown, the vicinity module 202 receives and processes the input data 114 to generate vicinity data 208.

Figure 3A:
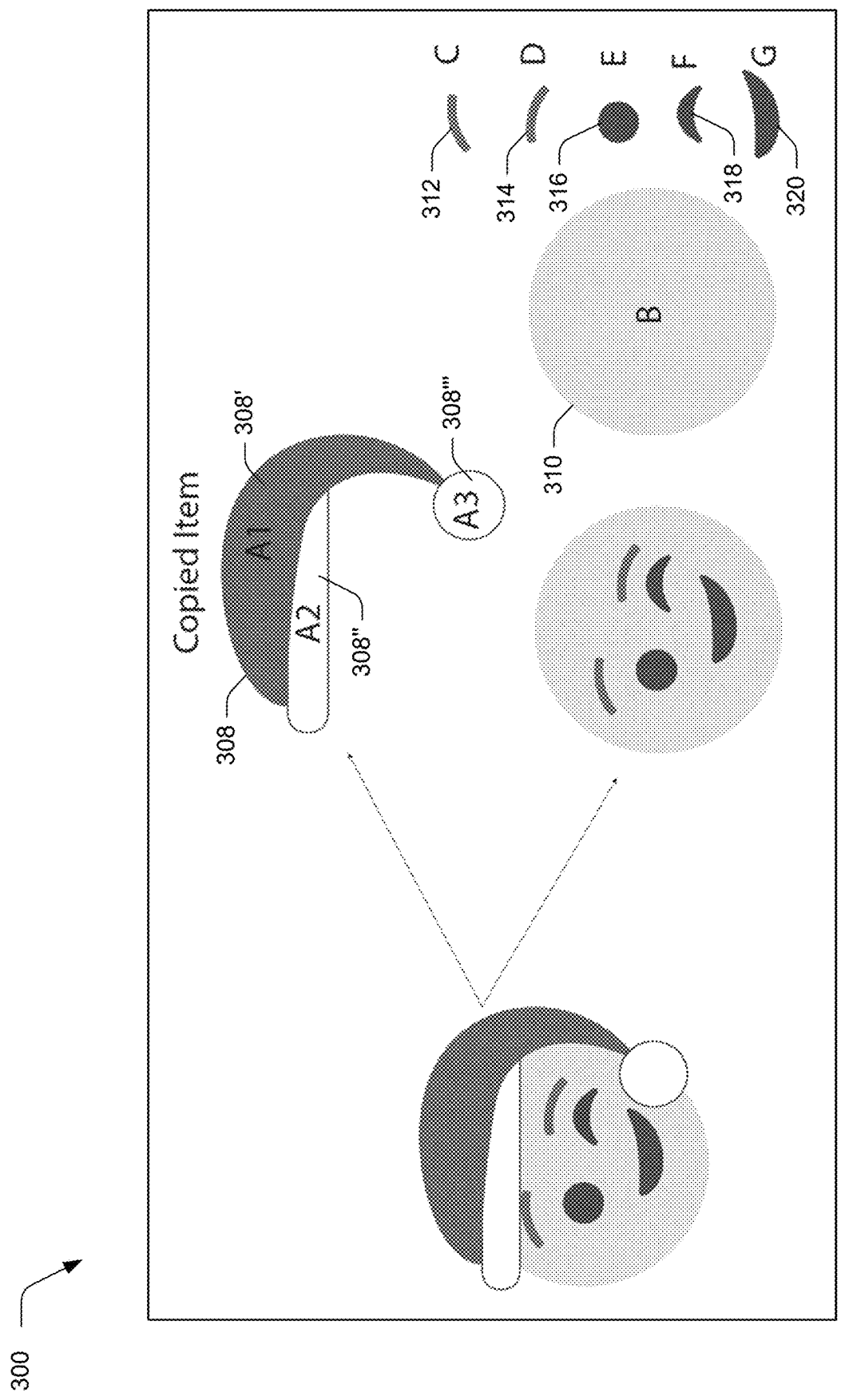
Figure 3B:
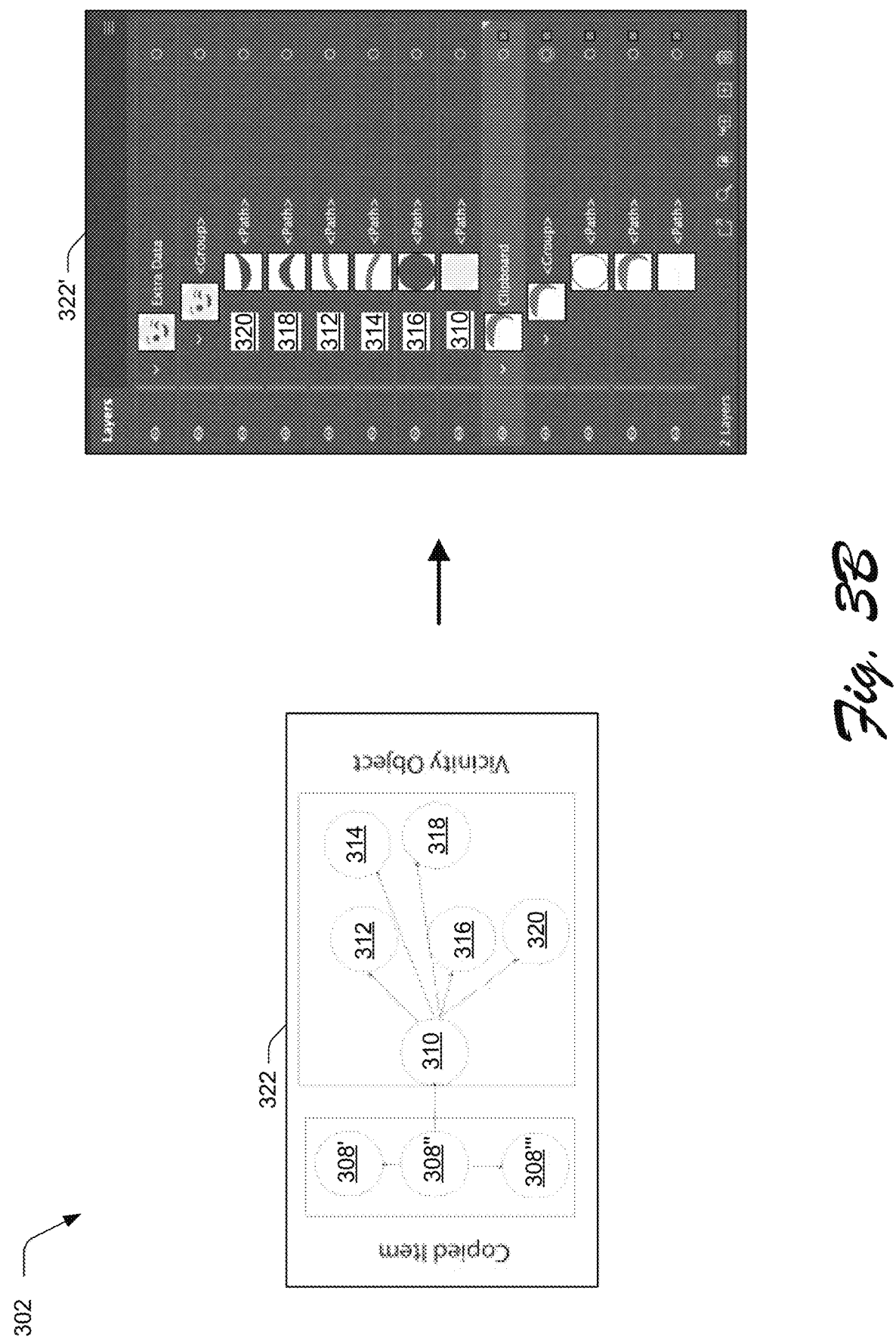
Figure 3C:
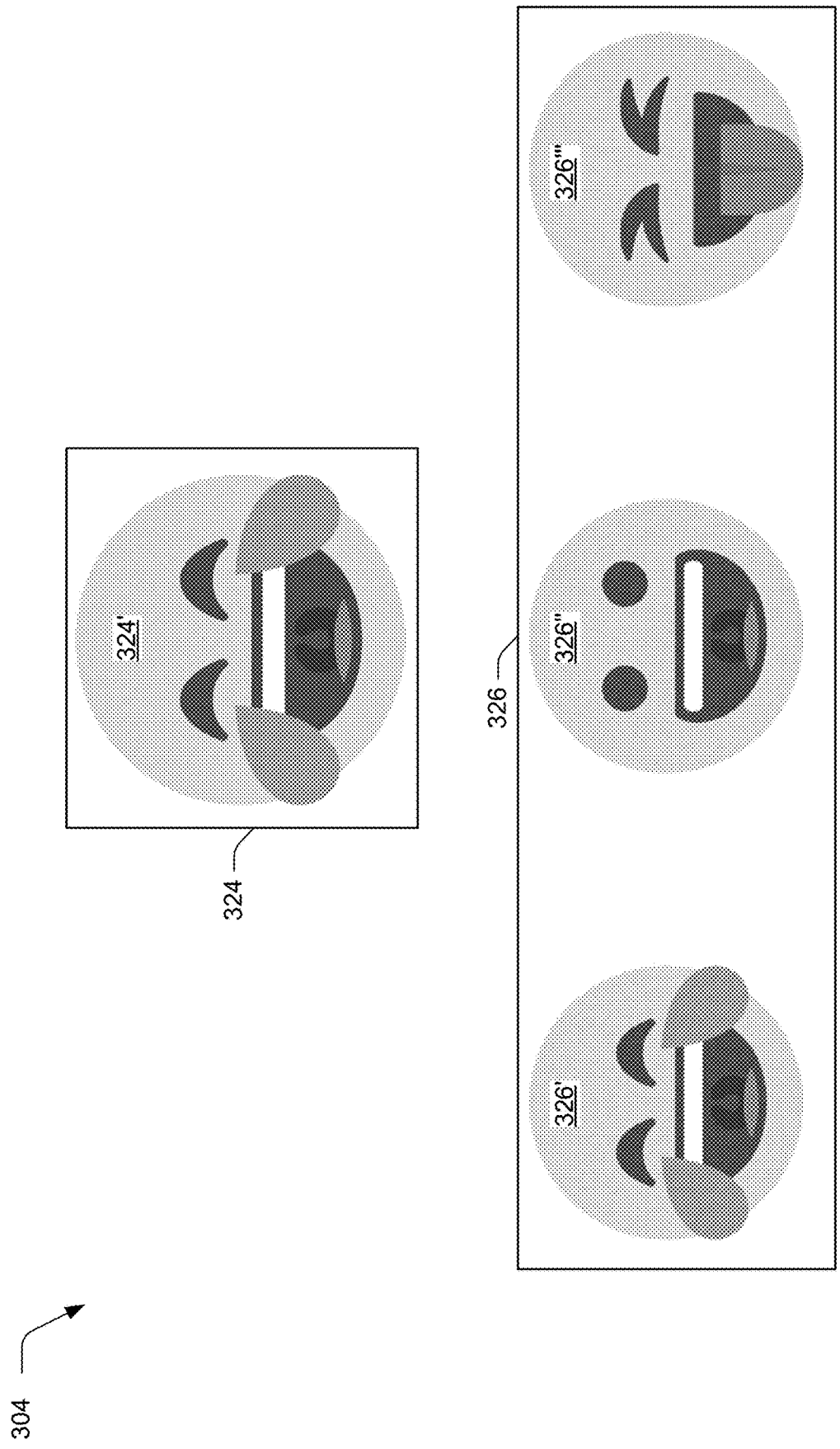

FIGS. 3A, 3B, 3C, and 3D illustrate examples of transforming a selected vector object for reproduction relative to a single target vector object and for reproduction relative to multiple target vector objects. FIG. 3A illustrates a representation 300 of a copied environment in a copy-paste pipeline. FIG. 3B illustrates a representation 302 of detecting vicinity vector objects. FIG. 3C illustrates a representation 304 of a pasted environment in the copy-paste pipeline. FIG. 3D illustrates a representation 306 of modified vector objects.

With reference to FIG. 2 and FIG. 3A, the vicinity module 202 receives the input data 114 describing a selected vector object 308 and vicinity vector objects 310-320 in the copied or source environment of the copy-paste pipeline. The vector object 308 is a stocking cap defined by three separate vector objects 308', 308'', and 308'''. As shown, vector object 308' is a stocking of the stocking cap, vector object 308'' is a base of the stocking cap, and vector object 308''' is a ball of the stocking cap. For example, vicinity vector object 310 is a face of an emoji, vicinity vector object 312 is a left eyebrow of the emoji, vicinity vector object 314 is a right eyebrow of the emoji, vicinity vector object 316 is an open eye of the emoji, vicinity vector object 318 is a winking eye of the emoji, and vicinity vector object 320 is a mouth of the emoji.

The vicinity module 202 processes the input data 114 to detect the vicinity vector objects 310-320 by identifying vector objects in the copied environment having bounding boxes that are adjacent to or overlap a bounding box of the vector object 308. In one example, the vicinity module 202 identifies adjacent bounding boxes to the bounding box of the vector object 308 using techniques such as dilation. As shown in FIG. 3B, the vicinity module 202 forms a graph 322 having a source node for the vector object 308. For instance, the vicinity module 202 includes the vector objects 308', 308'', and 308''' in the source node of the graph 322. The vicinity module 202 adds a node to the graph 322 for each of the vicinity vector objects 310-320 and connects the nodes with edges having weights. In one example, these weights are representable as:

$$D = w_1 * D_1 + w_2 * D_2$$

where: $D_1$ is a distance between bounding boxes of vector objects represented by two nodes of the graph 322; $D_2$ is a distance between the source node and a current node; $w_1$ is a weight applied to $D_1$; $w_2$ is a weight applied to $D_2$; and D is a total weight of a corresponding edge of the graph 322.

For example, $D_1$ is zero for nodes of the graph 322 representing vector objects with overlapping bounding boxes. The vicinity module 202 uses $w_2$ to penalize vector objects that are increasingly further away from the vector object 308 in the copied or source environment. For instance, the vicinity module 202 discards edges having weights that are greater than a threshold weight, and vector objects corresponding to nodes with discarded edges are not included in the vicinity vector objects 310-320. The vicinity module 202 adds the vicinity vector objects 310-320 included in the graph 322 to an extra data portion of a clipboard 322' which also includes the vector object 308. In an example, the vicinity module 202 generates the vicinity data 208 as describing the clipboard 322'.

The similarity module 204 receives the vicinity data 208 and the target data 116, and the similarity module 204 processes the vicinity data 208 and/or the target data 116 to generate candidate data 210. The target data 116 describes a paste or target environment of the copy-paste pipeline. As shown in FIG. 3C, the target data 116 describes a single target vector object 324 in one example. In another example, the target data 116 describes multiple target vector objects 326. For example, the single target vector object 324 includes target vector object 324' and the multiple target vector objects 326 include target vector object 326', target vector object 326'', and target vector object 326'''. For instance, the target vector object 326' is an emoji that is laughing with tears; the target vector object 326'' is an emoji with an open mouth; and the target vector object 326''' is an emoji with an extended tongue.

The similarity module 204 processes the vicinity data 208 and/or the target data 116 to determine how to transform the vector object 308 to reproduce the transformed vector object 308 relative to the single target vector object 324 in a first example. For instance, the similarity module 204 determines that vicinity vector object 310 is a scaled version of a face of the emoji depicted by the target vector object 324'. In this first example, the similarity module 204 determines a transformation that transforms the vicinity vector object 310 to be identical to the face of the emoji depicted by the target vector object 324' as one example usable to transform the vector object 308.

In a second example, the similarity module 204 processes the vicinity data 208 and/or the target data 116 to determine how to transform the vector object 308 to reproduce the transformed vector object 308 relative to the multiple target vector objects 326. To do so, the similarity module 204 defines $N_c$ as a number of vector objects included in the extra data portion of the clipboard 322' and $N_t$ as a number of vector objects included in the copy or target environment. Thus, in the first example, $N_t$ is one and in the second example, $N_t$ is three.

For example, similarity module 204 computes all vector objects that are similar to every ith vector object in $N_c$ among $N_t$. For all vector objects that are similar, the similarity module 204 determines a corresponding affine transformation matrix $T_i$. On applying $T_i$, it is possible that more than one vector object in $N_c$ is exactly similar or identical to some vector objects in $N_t$. In one example, this is representable as:

procedure GETPOSSIBLEXFORM($N_c, N_t$)

$\Pi \leftarrow$ multimap of vector objects in $N_c$ with respect to transformation $T_i$ for each $x_i$ in($N_c$)do $\Pi \leftarrow$ vector objects similar to $x_i$ in $N_t$ and transformation matrix for each $y_i, T_i$ in($\Pi_{x_i}$)do $y_i, T_i \leftarrow$ similar object in $N_t$ and transformation matrix $\Pi(t_i) \leftarrow x_i$ $\Pi$ contains the list of possible transformations where: $N_c$ represents the vector objects included in the extra data portion of the clipboard 322'; and $N_t$ represents the vector objects included in the copied or target environment of the copy-paste pipeline.

For example, the similarity module 204 calculates similarity between vector objects using Procrustes distance. In this example, the similarity module 204 represents paths of the vector objects using cubic Bezier splines each with N anchor points. For instance, each of the anchor points is represented by three points ($p_{in}$, p, $p_{out}$) where $p_{in}$ is an in handle at an anchor point and $p_{out}$ is an out handle at the anchor point. An affine transformation matrix is a combination of translation, scaling, and rotation which is representable as:

$$P = \begin{bmatrix} p_{in0x} & p_{in0y} \\ p_{0x} & p_{0y} \\ p_{out0x} & p_{out0y} \\ \vdots & \vdots \\ p_{in(N-1)x} & p_{in(N-1)y} \\ p_{(N-1)x} & p_{(N-1)y} \\ p_{out(N-1)x} & p_{out(N-1)y} \end{bmatrix}$$

where: N represents the anchor points of the cubic Bezier splines.

In order to compute a translation for the paths of the vector objects, the similarity module 204 first computes a centroid for each path. The similarity module 204 then computes the translation for each path using the centroid as an origin for the path. In one example, this is representable as:

$$\overline{P}_{centroidX} = \frac{\sum_{i=0}^{3N-1} x_i}{3N}, \overline{P}_{centroidY} = \frac{\sum_{i=0}^{3N-1} y_i}{3N}$$

where: $x_i$, $y_i$ represent columns 0 and 1, respectively, of affine transformation matrix P; and N represents the anchor points of the cubic Bezier splines.

For example, the similarity module 204 translates the points such that their mean is translated to the origin. For instance, $(x_i,y_i) \rightarrow (x_i - \overline{P}_{centroidX}, y_i - \overline{P}_{centroidY})$ gives points $(x_0 - \overline{P}_{centroidX}, y - \overline{P}_{centroidY})$, and so forth. In order to compute a scale for the paths of the vector objects, the similarity module 204 normalizes each path such that a root mean square distance from the points to the translated origin is 1 which is representable as:

$$s = \sqrt{\frac{\sum_{i=0}^{3N-1}\left((x_i - \overline{P}_{centroidX})^2 + (y_i - \overline{P}_{centroidY})^2\right)}{3N}}$$

where: $x_i$, $y_i$ represent columns 0 and 1, respectively, of affine transformation matrix P; and N represents the anchor points of the cubic Bezier splines.

In the previous example, the scale becomes 1 when the point coordinates are divided by the vector object's scale s. Thus, the normalized factor s is the scaling component of the corresponding path. In order to compute rotation between two paths, the similarity module 204 fixes one of the two paths as a reference orientation and rotates the other path around the origin until an optimal angle of rotation (θ) is found such that a sum of the squared distances between the corresponding points in minimized. For example, if points belonging to the two paths are $(x_i,y_i)$, $(w_i,z_i)$ and each has N anchor points, then the optimal angle of rotation (θ) of $(x_i,y_i)$ with respect to $(w_1,z_i)$ is determinable using two-dimensional Procrustes analysis as:

$$\theta = \tan^{-1}\left(\frac{\sum_{i=0}^{3N-1}(w_i y_i - z_i x_i)}{\sum_{i=0}^{3N-1}(w_i x_i + z_i y_i)}\right)$$

In order to determine a transformation matrix to apply to the vector object 308, the similarity module 204 orders the transformation matrices based on a cardinality of the vicinity vector objects 310-320 which are identical to vector objects included in the single target vector object 324 or in the multiple target vector objects 326 after being transformed by the transformation as well as a visual saliency denoting a visual importance of the transformation. In an example, the similarity module 204 computes parameters for weighting each of the transformation matrices as:

$$C_{T_i} = \left(n(\sum_{T_i})\right)$$

where: $C_{T_i}$ is the cardinal number; and $T_i$ is a corresponding transformation.

The visual saliency is representable as:

$$V_{T_i} = \left(\sum_{i=1}^{|F|} \text{Area } F_i\right)$$

where: Area is an area of vector objects corresponding to $\Sigma_{T_i}$.

The similarity module 204 computes a score of a transformation matrix $T_i$ as a weighted linear combination of normalized $C_{T_i}, V_{T_i}$ which is representable as:

$$\omega_p = (\omega_C * C_{T_i} + \omega_V * V_{T_i})$$

where: $\omega_C, \omega_V$ are weights defining an importance of the cardinal and visual saliency of a transformation matrix, respectively.

The similarity module 204 selects a transformation matrix having a highest score, transforms the vector object 308 using the selected transformation matrix, and reproduces the transformed vector object 308 relative to the single target vector object 324 or in the multiple target vector objects 326. The similarity module 204 generates the candidate data 210 as describing the reproduced transformed vector object 308 relative to the single target vector object 324 or in the multiple target vector objects 326.

With reference to FIG. 2 and FIG. 3D, the display module 206 receives the candidate data 210 and the input data 114, and the display module 206 processes the candidate data 210 to display a modified vector object 328. As shown, the modified vector object 328 is the target vector object 324' with a transformed vector object 330 reproduced at a scale, translation, and rotation that matches a scale, translation, and rotation of the target vector object 324'. In an example, the display module 206 processes the candidate data 210 to display multiple modified vector objects 332. For instance, the multiple modified vector objects 332 are the target vector objects 326', 326", 326'" with a transformed vector object 334 reproduced at a scale, translation, and rotation that matches a scale, translation, and rotation of the target vector objects 326', 326", 326'".

In one example, the candidate data 210 describes the target vector objects 326', 326", 326'" as candidate vector objects for receiving the transformed vector object 334. In this example, the display module 206 generates indications of the candidate vector objects for display in the user interface 134. A user interacts with an input device (a mouse, a touchscreen, a stylus, etc.) relative to the user interface 134 to generate additional input data 114 indicating that each of the candidates is to receive the transformed vector object 334, and the display module 206 generates indications of the multiple modified vector objects 332 for display in the user interface 134.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data describing a selection of a vector object is received and a modified vector object is generated for display in a user interface by transforming the vector object.

Input data describing a selection of a vector object is received (block 402). For example, the computing device 102 implements the context module 110 to receive the input data describing the selection of the vector object. Vicinity vector objects are detected based on a bounding box of the vector object and bounding boxes of the vicinity vector objects (block 404). In an example, the context module 110 detects the vicinity vector objects.

A transformation is identified based on similarities between the vicinity vector objects and target vector objects (block 406). The computing device 102 implements the context module 110 to identify the transformation in some examples. A modified vector object is generated for display in a user interface by transforming the vector object using the transformation and reproducing the transformed vector object relative to a particular target vector object of the target vector objects (block 408). In one example, the context module 110 generates the modified vector object.

Figure 5:
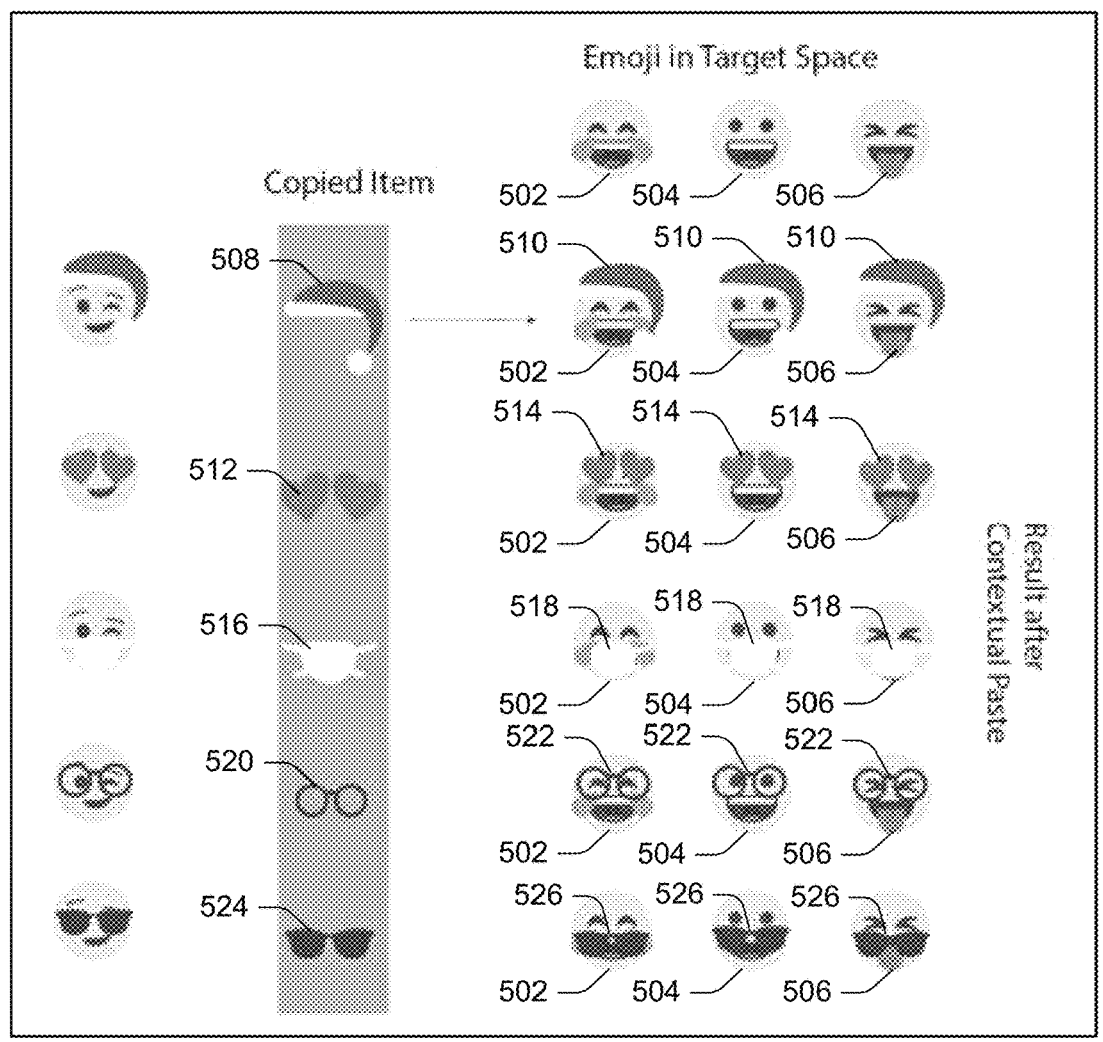
FIG. 5 illustrates an example representation of transforming different selected vector objects for reproduction relative to a group of target vector objects.

FIG. 5 illustrates an example representation 500 of transforming different selected vector objects for reproduction relative to a group of target vector objects. The representation 500 includes target vector objects 502-506. For example, the context module 110 receives the input data 114 describing a selected vector object 508 and the context module 110 receives the target data 116 describing the target vector objects 502-506. The context module 110 detects vicinity vector objects based on a bounding box of the vector object 508 and bounding boxes of the vicinity vector objects described by the input data 114. For instance, the context module 110 identifies a transformation usable to transform a vicinity vector object to be identical to at least one vector object included in the target vector objects 502-506. The context module 110 transforms the vector object 508 using the transformation to generate a transformed vector object 510 and reproduces the transformed vector object 510 relative to each of the target vector objects 502-506.

For example, the context module 110 receives the input data 114 describing a selected vector object 512. As shown, the vector object 512 depicts a pair of hearts for covering eyes of an emoji. The context module 110 transforms the vector object 512 using the transformation to generate a transformed vector object 514. For instance, the context module 110 reproduces the transformed vector object 514 relative to each of the target vector objects 502-506.

In another example, the context module 110 receives the input data 114 describing a selected vector object 516 which depicts a mask. The context module 110 applies the transformation to the vector object 516 to generate a transformed vector object 518. For example, the context module 110 reproduces the transformed vector object 518 relative to each of the target vector objects 502-506.

Consider an example in which the context module 110 receives the input data 114 describing a selected vector object 520. In this example, the vector object 520 is a pair of glasses for an emoji. The context module 110 transforms the vector object 520 using the transformation to generate a transformed vector object 522. In the illustrated example, the context module 110 reproduces the transformed vector object 522 relative to each of the target vector objects 502-506.

In one example, the context module 110 receives the input data 114 describing a selected vector object 524 which is a pair of sunglasses. The context module 110 transforms the vector object 524 using the transformation to generate a transformed vector object 526. For example, the context module 110 uses a same transformation to transform each of the vector objects 508, 512, 516, 520, 524 because each of the vector objects 508, 512, 516, 520, 524 has a same group of the vicinity vector objects which are used to identify the transformation. As shown, the context module reproduces the transformed vector object 526 relative to each of the target vector objects 502-506.

Figure 6:
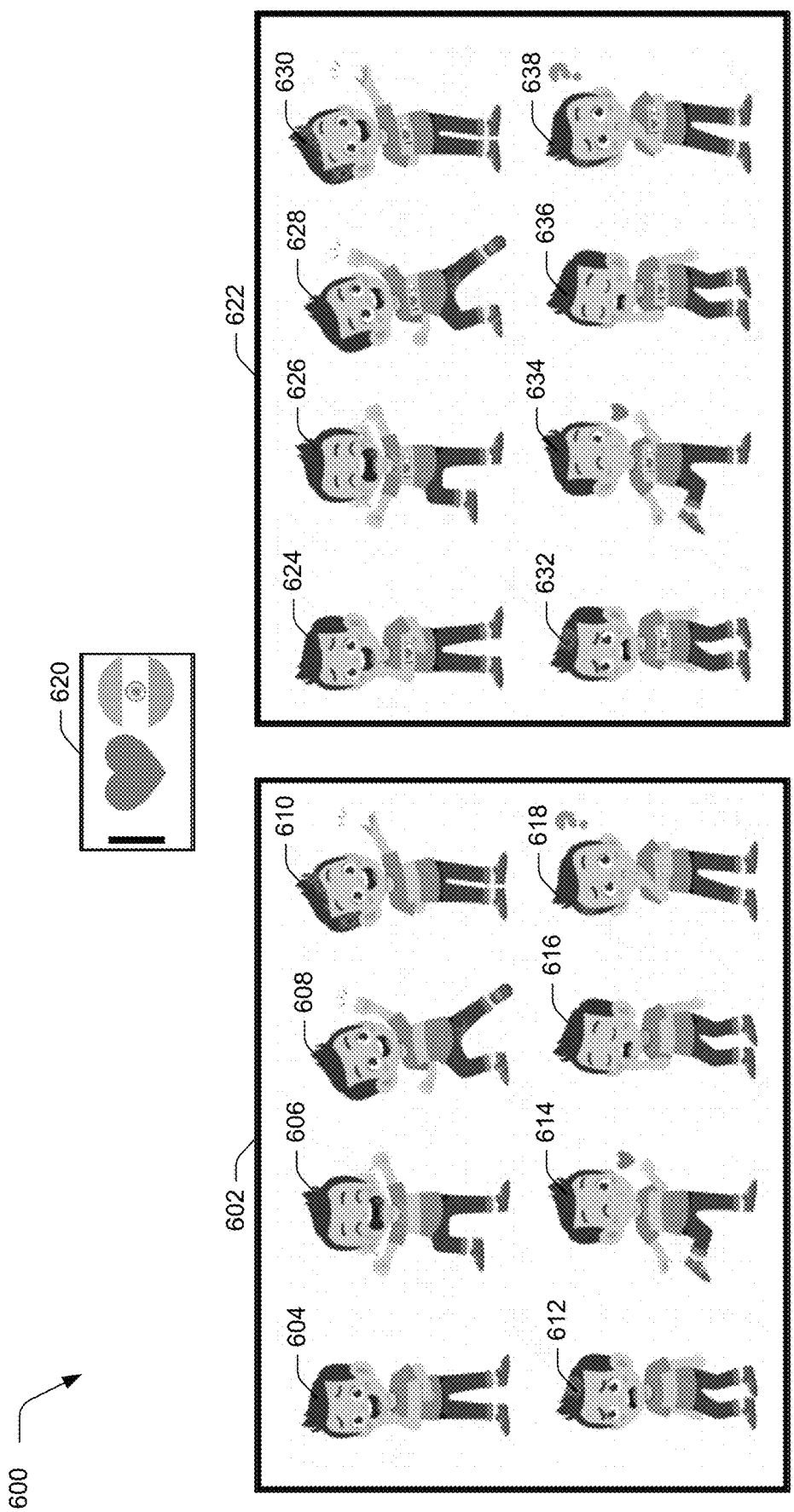
FIG. 6 illustrates an example representation of transforming a selected vector object for reproduction relative to various poses of a vector-based animated character.

FIG. 6 illustrates an example representation 600 of transforming a selected vector object for reproduction relative to various poses of a vector-based animated character. The representation 600 includes target vector objects 602 which include the vector-based animated character in different poses 604-618. The representation 600 also includes a selected vector object 620 which depicts the letter "I" and a heart symbol followed by a portion of a flag. The context module 110 receives the input data 114 describing the vector object 620 and the context module 110 determines a different transformation to apply to the vector object 620 for each of the poses 604-618. For example, vicinity vector objects are vector objects included in any of the poses 604-618.

In another example, a single vicinity vector object is usable to identify a different transformation for the vector object 620 for each of the poses 604-618. In this example, the vicinity vector object is the light-colored stripe across the animated character's shirt. For instance, the context module 110 transforms the vicinity vector object to be identical to the light-colored stripe in each of the poses 604-618. The context module 110 uses the transformation that causes the vicinity vector object to be identical to the light-colored stripe in each of the poses 604-618 to generate modified vector objects 622.

The modified vector objects 622 include vector objects 624-638 which each correspond to the poses 604-618, respectively. The vector objects 624-638 each include the vector object 620 transformed to match an orientation of the light-colored stripe across the animated character's shirt in each of the poses 604-618. This functionality is not possible using conventional copy-paste systems in which a default pasted orientation of the vector object 620 must be manually adjusted to align with the light-colored stripe in each of the poses 604-618 in order to generate the modified vector objects 622.

Figure 7A:
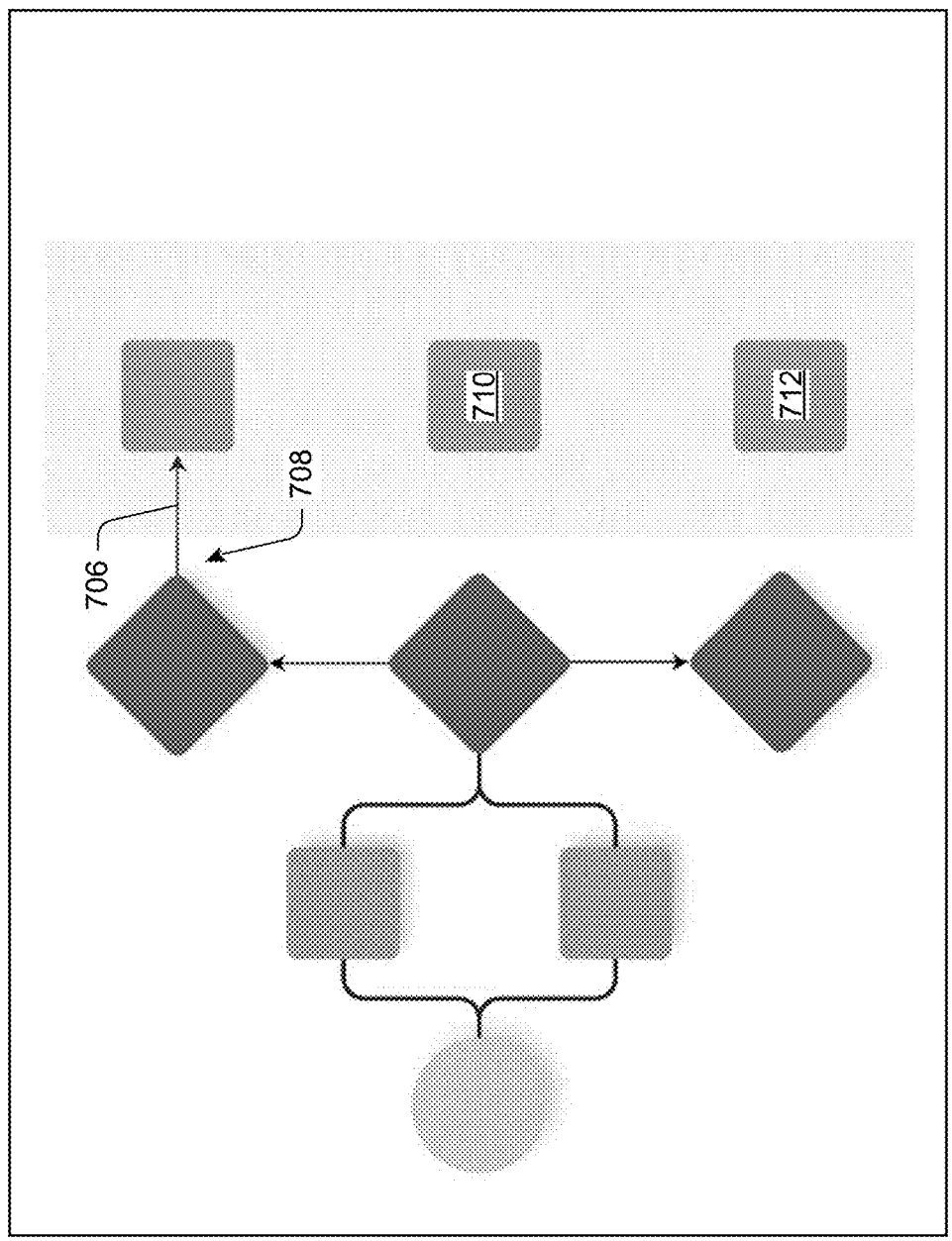
FIGS. 7A, 7B, and 7C illustrate an example user interface for context-based copy-paste systems.
Figure 7B:
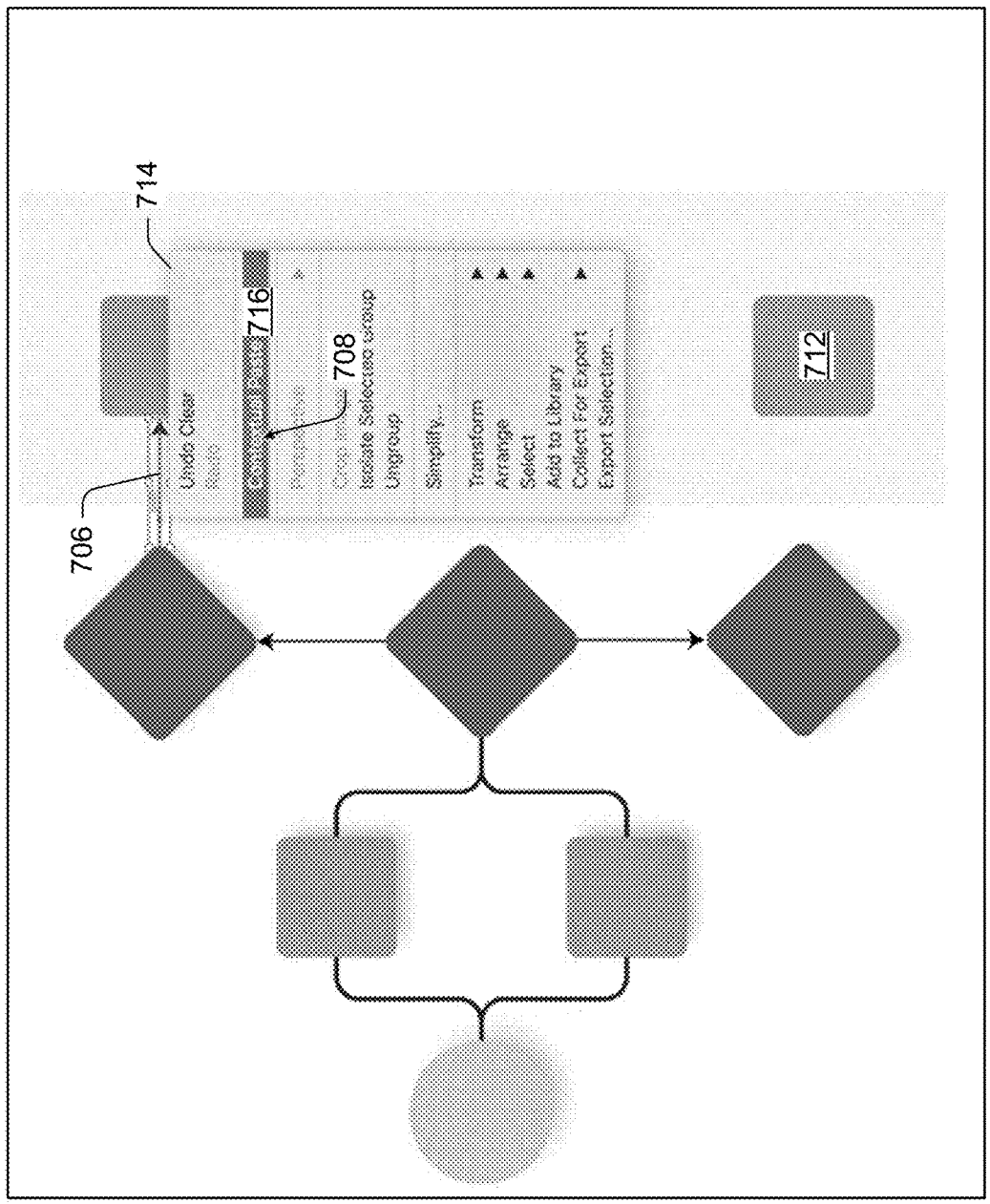
Figure 7C:
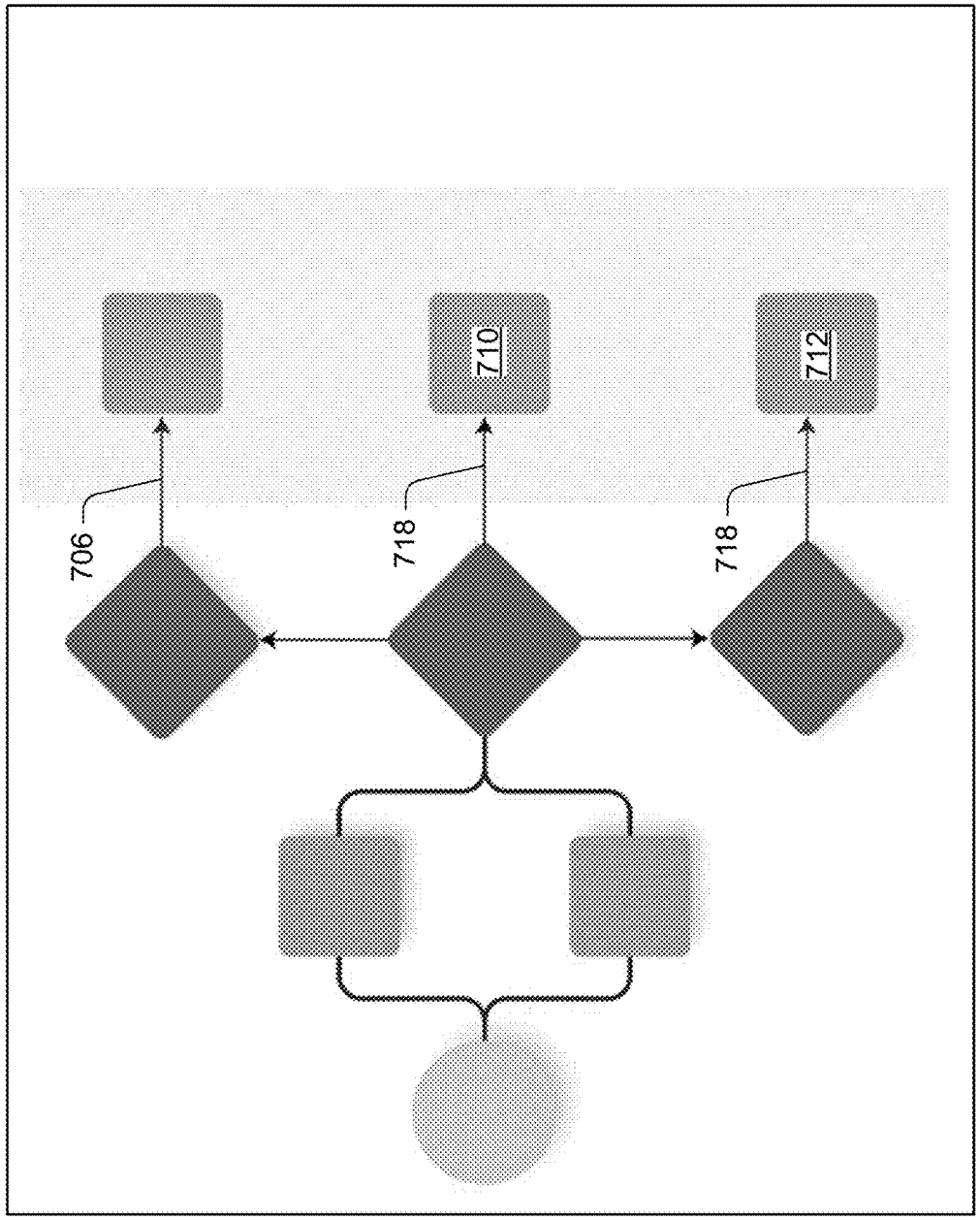

FIGS. 7A, 7B, and 7C illustrate an example user interface for context-based copy-paste systems. FIG. 7A illustrates a representation 700 of selecting a vector object. FIG. 7B illustrates a representation 702 of a user interface element for executing a context-based paste operation. FIG. 7C illustrates a representation 704 of a transformed vector object that is reproduced relative to target vector objects.

As shown in FIG. 7A, the representation 700 includes a selected vector object 706. For example, a user interacts with an input device (e.g., a mouse, a stylus, a touchscreen, a keyboard, etc.) to manipulate a cursor 708 in the user interface to select the vector object 706 for transformation and reproduction relative to target vector objects 710, 712. With reference to FIG. 7B, the user interacts with the input device to manipulate the cursor 708 relative to a user interface menu 714. For example, the user continues to manipulate the cursor 708 to interact with a user interface element 716.

With reference to FIG. 7C, the interaction with the user interface element 716 generates input data 114 describing the selected vector object 706. The context module 110 receives the input data 114 and also receives target data 116 describing the target vector objects 710, 712. For instance, the context module 110 processes the input data 114 and the target data 116 to identify a transformation which the context module 110 applies to the selected vector object 706 to generate a transformed vector object 718. As shown, the transformed vector object 718 is reproduced relative to the target vector object 710 and reproduced relative to the target vector object 712.

Example System and Device

Figure 8:
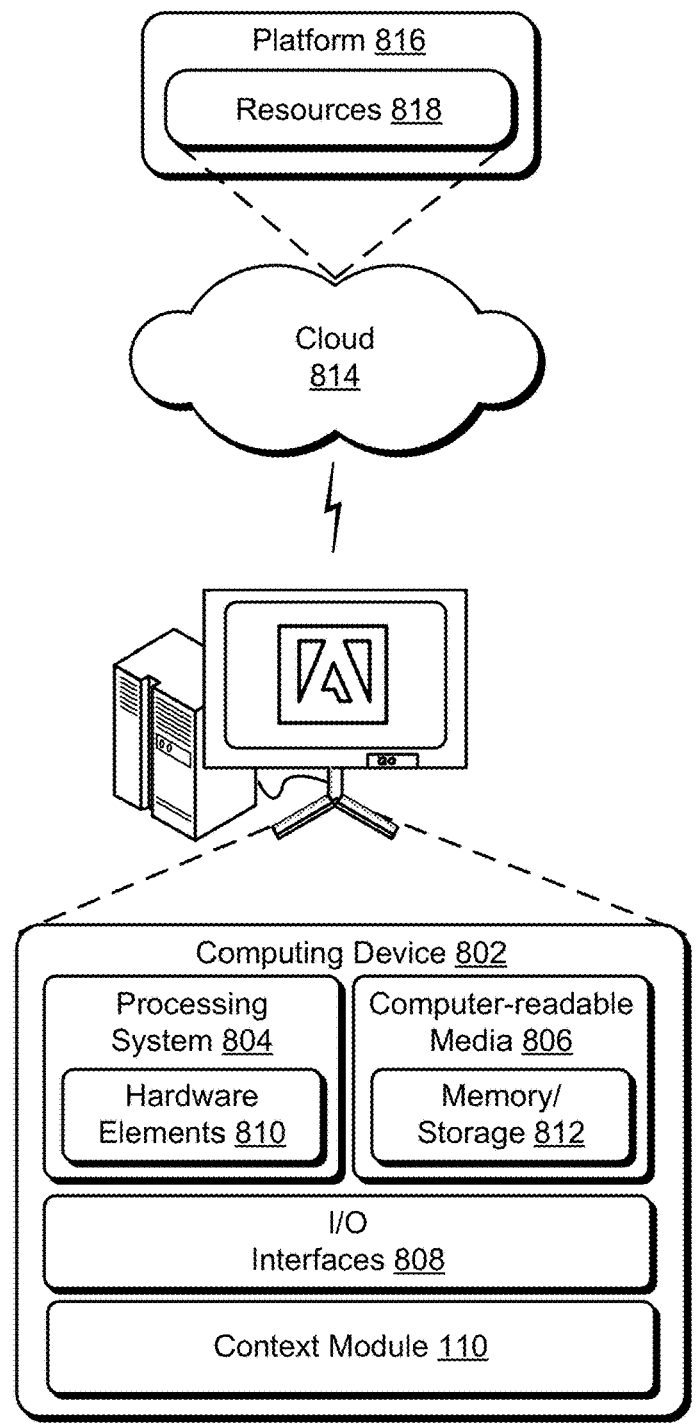
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the context module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of context-based copy-paste systems have been described in language specific to structural features and/or methods, it is to be understood that the appended claims are not necessarily limited to the specific features or methods described. Rather, the specific features and methods are disclosed as example implementations of context-based copy-paste systems, and other equivalent features and methods are intended to be within the scope of the appended claims. Further, various different examples are described and it is to be appreciated that each described example is implementable independently or in connection with one or more other described examples.

What is claimed is:

1. A method comprising:
   receiving, by a processing device, input data describing a selection of a vector object in a user interface;
   copying, by the processing device, the vector object selected via the user interface for storage into a clipboard;
   detecting, by the processing device, a vicinity vector object in the user interface based on a bounding box of the vector object and a bounding box of the vicinity vector object;
   copying, by the processing device, the vicinity vector object detected from the user interface for storage into the clipboard;
   identifying, by the processing device, an affine transformation based on a similarity between the vicinity vector object as stored in the clipboard and a plurality of target vector object in the user interface;
   generating, by the processing device, a transformed vector object by transforming the selected vector object stored in the clipboard based on the affine transformation; and
   displaying, by the processing device, the transformed vector object in the user interface relative to the target vector object.

2. The method as described in claim 1, further comprising determining a plurality of transformable vector objects of the vicinity vector object that are transformable using the affine transformation to be identical to the target vector object.

3. The method as described in claim 2, wherein the affine transformation is identified at least partially based on a number of the plurality of transformable vector objects.

4. The method as described in claim 2, wherein the affine transformation is identified at least partially based on a cumulative area of the plurality of transformable vector objects.

5. The method as described in claim 1, further comprising determining a plurality of candidate vector objects of the target vector object based on the similarities between the vicinity vector object and the target vector object.

6. The method as described in claim 5, wherein the target vector object is selected from the plurality of candidate vector objects based on a user input.

7. The method as described in claim 5, further comprising generating a modified vector object for each of the plurality of candidate vector objects by reproducing the transformed vector object relative to each of the plurality of candidate vector objects.

8. The method as described in claim 1, wherein the affine transformation includes at least one of a rotation, a scaling, or a translation.

9. The method as described in claim 1, wherein the vicinity vector object is detected based on a plurality of distances between the bounding box of the vicinity vector object and the bounding box of the vector object.

10. A system comprising:
a processing device; and
a memory component storing instructions, which, when executed by the processing device, cause the processing device to perform operations comprising:
receiving input data describing a selection of a vector object in a user interface;
copying, by the processing device, the vector object selected via the user interface for storage into a clipboard;
detecting a vicinity vector object in the user interface based on a bounding box of the vector object and bounding box of the vicinity vector object;
copying the vicinity vector object detected from the user interface for storage into the clipboard;
identifying a plurality of affine transformations based on similarities, respectively, between the vicinity vector object in the clipboard and a plurality of target vector objects in the user interface;
selecting a target vector object from the plurality of target vector objects based on the plurality of affine transformations;
generating a transformed vector object by transforming the selected vector object stored in the clipboard based on the affine transformation associated with the selected target vector object; and
displaying the transformed vector object in the user interface relative to the selected target vector object.

11. The system as described in claim 10, wherein the affine transformation is identified at least partially based on a number of the plurality of transformable vector objects.

12. The system as described in claim 10, wherein the affine transformation is identified at least partially based on a cumulative area of the plurality of transformable vector objects.

13. The system as described in claim 10, wherein the affine transformation includes at least one of a rotation, a scaling, or a translation.

14. The system as described in claim 10, wherein the operations further comprise determining a plurality of candidate vector objects of the plurality of target vector objects based on the similarities between the vicinity vector object and the plurality of target vector objects.

15. The system as described in claim 14, wherein the target vector object is selected from the plurality of candidate vector objects based on a user input.

16. A non-transitory computer-readable storage medium storing executable instructions, which, when executed by a processing device, cause the processing device to perform operations comprising:
receiving input data describing a selection of a vector object in a user interface;
copying the vector object selected via the user interface for storage into a clipboard;
detecting a vicinity vector object in the user interface based on a bounding box of the vector object and a bounding box of the vicinity vector object;
copying the vicinity vector object into the clipboard;
identifying a plurality of affine transformations based on similarities, respectively, between the vicinity vector object stored in the clipboard and a plurality of target vector objects in the user interface;
selecting a target vector object from the plurality of target vector objects based on the plurality of affine transformations; and
generating a transformed vector object for display in a user interface by transforming the selected vector object stored in the clipboard based on an affine transformation matrix associated with the selected target vector object.

17. The non-transitory computer-readable storage medium as described in claim 16, wherein the plurality of affine transformations includes at least one of a rotation, a scaling, or a translation.

18. The non-transitory computer-readable storage medium as described in claim 16, wherein the operations further comprise determining a plurality of candidate vector objects of the plurality of target vector objects based on the similarities between the vicinity vector object and the plurality of target vector objects.

19. The non-transitory computer-readable storage medium as described in claim 18, wherein the target vector object is selected from the plurality of candidate vector objects based on a user input.

20. The non-transitory computer-readable storage medium as described in claim 18, wherein the operations further comprise generating a modified vector object for each of the plurality of candidate vector objects by reproducing the transformed vector object relative to each of the plurality of candidate vector objects.

* * * * *

UNITED STATES PATENT AND TRADEMARK OFFICE
CERTIFICATE OF CORRECTION

| | | |
|---|---|---|
| PATENT NO. | : 11,941,232 B2 | Page 1 of 1 |
| APPLICATION NO. | : 17/832923 | |
| DATED | : March 26, 2024 | |
| INVENTOR(S) | : Harish Kumar, Praveen Kumar Dhanuka and Arushi Jain | |

It is certified that error appears in the above-identified patent and that said Letters Patent is hereby corrected as shown below:

In the Claims

Column 16, Line 39, after "clipboard and a", delete "plurality of", therefor.

Signed and Sealed this
Fourth Day of June, 2024

*Katherine Kelly Vidal*
Katherine Kelly Vidal
*Director of the United States Patent and Trademark Office*